United States Patent

Wilkening et al.

[11] Patent Number: 5,832,415
[45] Date of Patent: Nov. 3, 1998

[54] METHOD AND APPARATUS FOR CALIBRATING A CONTROL APPARATUS FOR DEFLECTING A LASER BEAM

[75] Inventors: Christian Wilkening, Diessen/Ammersee; Jürgen Serbin; Hans Langer, both of Gräfelfing; Guido Hornig; Andreas Rönner, both of München, all of Germany

[73] Assignee: EOS GmbH Electro Optical Systems, Planegg, Germany

[21] Appl. No.: 817,991

[22] Filed: Apr. 18, 1997

[30] Foreign Application Priority Data

Oct. 18, 1994 [DE] Germany .......................... 44 37 284.1

[51] Int. Cl.[6] .................................................. G01C 25/04
[52] U.S. Cl. ................................ 702/86; 702/95
[58] Field of Search .................... 364/571.01–571.08, 364/579, 580, 167.01, 474.34, 474.35, 468.26, 468.27; 702/85, 86, 94, 95, 150

[56] References Cited

U.S. PATENT DOCUMENTS

| 4,453,085 | 6/1984 | Pryor ........................................ 250/203 |
| 4,585,342 | 4/1986 | Lin et al. ................................ 356/124 |
| 5,430,666 | 7/1995 | DeAngelis et al. ................. 364/571.01 |
| 5,460,758 | 10/1995 | Langer et al. .......................... 264/101 |

FOREIGN PATENT DOCUMENTS

| 2 696 969 | 4/1994 | France . |
| 3030922 | 5/1982 | Germany . |
| 4112695A1 | 7/1992 | Germany . |
| 4134265C2 | 4/1993 | Germany . |
| 4227817A1 | 2/1994 | Germany . |
| 4300478C1 | 8/1994 | Germany . |
| 3248916 | 9/1991 | Japan . |
| 4189200 | 7/1992 | Japan . |
| WO 94/15265 | 7/1994 | WIPO . |

OTHER PUBLICATIONS

H. Winterberg, et al. "Topometrische 3D–KoordinatenmeBtechnik", Laser in der Technik, Vortrage des 11. Internationalen Kongresses, Laser 93, Springer Verlag, pp. 195–198 (partial Translation).

P. E. Verboven, "Distortion Correction Formulas for Pre–Objective Dual Galvanometer Laser Scanning", Applied Optics, 1988 No. 20, pp. 4172–4173.

Patent Abstracts of Japan, vol. 18, No. 250 (P–1736), May 15, 1994 (JP,A,06–34349.

*Primary Examiner*—John Barlow
*Assistant Examiner*—Craig Steven Miller
*Attorney, Agent, or Firm*—George W. Neuner

[57] ABSTRACT

In a method for calibrating the deflection control of a laser beam a light-sensitive medium (5) is exposed to a laser beam (2) at predetermined positions for generating a test pattern (20), thereafter digitized partial pictures of pattern portions (21) of the test pattern (20) are produced and the digitized partial pictures are composed to a digitized overall picture of the test pattern (20). The correction data for the control (4) for deflecting the laser beam (2) are calculated on the basis of a comparison of actual positions of the laser beam (2) on the digitized overall picture with predetermined desired coordinates.

20 Claims, 2 Drawing Sheets

METHOD AND APPARATUS FOR CALIBRATING A CONTROL APPARATUS FOR DEFLECTING A LASER BEAM

The invention relates to a method and an apparatus according to the preamble of claim 15 for calibrating a deflection control of a laser beam for rapid prototyping systems.

In a process known as "rapid prototyping" or "forming a production method using laser technology" a three-dimensional object is produced in a layerwise manner by application and subsequent solidification of successive layers of an initially liquid or powderous material. The solidification is caused by a focused light beam in the form of a laser beam which is directed or deflected, resp., to places of the layer corresponding to the object and causes the solidification of the material thereat. The laser beam is deflected by a scanner which is operated by a control apparatus in such a manner that the laser beam can be deflected to any desired position within a working plane which is defined by the uppermost layer to be solidified of the object. The rapid prototyping method and an apparatus for carrying out this method are for example known from DE 41 34 265.

A correction table is required for the scanner control apparatus for supplying the coordinates to the scanner in the form of real coordinate values, i.e. in the form of position coordinates of the point where the laser beam strikes the working plane. The correction table comprises a correspondence of the real coordinate values and the scanner coordinates, i.e. the coordinates of the deflection mirrors included in the scanner. This correction table may be analytically produced, whereby a trigonometric field distortion and effects of the scanner optical system are compensated. However, specific errors of the scanner and of the process can not be corrected in an analytical manner. Thus, a calibration is made for correcting the scanner control, whereby the calibration adjusts the correction table by measuring an error between a desired position and the actual position of the laser beam within the working plane.

In a known calibration method the actual position of the laser beam is measured at various positions using a position sensitive detector in the working plane of the scanner. A correction table is generated by comparing the measured actual positions with desired positions and interpolating the points of measurement. The positional accuracy of the detector is decisive for the precision of the calibration. This positional accuracy is required for all the systems involved. Since this process lasts very long for large working fields, about 6–8 hours are required for calibrating a scanner for a working field of 600 mm×600 mm, a possible drift of the laser and of the scanner are systematic errors of the calibration. The mechanical system for carrying out the calibration, i.e. the detector and an apparatus for positioning the detector, are required within the rapid prototyping system itself. Owing to the required long calibration time it is neither meaningful nor profitable to carry out the method in an iterative manner. Moreover, the detector can be used for certain wavelengths of the laser light and certain power levels of the laser only, which causes a limited applicability of the method.

In its a further known version of a calibration method to deflect the laser beam through a mirror directly into a video camera. The individual target points of the laser beam rather than a picture of the entire working field are digitized in the camera. A correction table is generated by interpolating various actual positions of the laser beam. This method can be used in an iterative manner because of its high speed. However, the resolution of the camera directly affects the precision. The larger the working field, the lower the resolution.

An apparatus according to the preamble of claim 15 is known from WO 94/15265. In a method known from WO 94/15265 the laser beam is directed to various positions on an inflammable base in order to mark preprinted frames thereon which indicate desired positions of the laser beam. Thereafter, a pixel scanner measures the deviation of the actual positions from the desired positions of the laser beam on the base and a correction table is produced. The precision of this method depends on the resolution of the scanner used for evaluating the base, and on the precision of the preprinted frame and on the adjustment of the base with the preprinted frame in the rapid prototyping system. The method is very time-consuming, because the base must be digitized and the center point, the desired position of the laser beam and the actual position of the laser beam must be determined for each frame.

A method for calibrating a robot arm is known from FR-A-2 696 969 whereby a laser directing a laser beam onto a base is mounted to the robot arm. The base and thus also the target point of the laser beam on the base are recorded by a fixedly mounted camera. The image is digitized and used for calibrating the robot arm.

The U.S. Pat. No. 4,453,085 discloses a method whereby the position of a robot arm is measured in electro-optical manner and compared with an external reference point so as to improve the positioning precision of the robot arm.

The JP 06-034349 discloses a method for controlling the evenness of a surface whereby a generated light/darkpicture is integrally processed. For reducing the effect of a hole in the object a limit value for the half tone in the light/dark picture is defined so that the hole is not taken into consideration.

It is the object of the invention to provide a calibrating method and apparatus allowing to carry out a high-speed and high-precision calibration and assessment of a previous calibration without limiting the size of the working field for reasons of resolution.

This object is achieved by a method according to claim 1 and by an apparatus according to claim 15. Further developments of the method are defined in the subclaims.

It is the advantage of the method that the test pattern can be produced in a very short time period, for example in 30 seconds. Effects of laser and scanner drift occurring within this time period are insignificant for the calibration. Thus, a stationary state is calibrated. In case that drifts occur between one calibration and the following calibration, these drifts do not distort the calibration, but change or shift the entire test pattern by an offset value. The complete calibration can be made considerably faster than with a method using a position-sensitive detector. The method is therefore advantageous in that it can be carried out iteratively and thereby achieves a high precision.

The test pattern can be evaluated in an apparatus different from that producing the test pattern. This is preferable, because the apparatus for evaluating the test pattern can be used for the calibration of laser controls of various rapid prototyping systems and the calibration can be made at a central location. The expense of time and work for a user of a rapid prototyping system is therefore considerably reduced.

For digitizing the test pattern may be decomposed into individual pictures whereby coordinates of features of the individual pictures are composed after digitizing for evaluating the same. Digitizing can be carried out for example with a video camera or a pixel scanner having a corresponding resolution and gray scale ratio detection. The use of a pixel scanner is a particularly economic solution for picture recording.

The size of the individual pictures can be varied by the selected lens of the camera, whereby the precision can be enhanced. This renders the method independent of the resolution of the electronic circuit of the video camera. The composition of individual pictures makes it possible to use working field sizes which are only limited by the constrains of positioning the camera.

When using a film adapted to the actual wavelength of the laserlight and to the actual laser power for generating the test pattern the method may be applied to rapid prototyping systems having a great variety of lasers.

An embodiment of the invention will be described with reference to the Figures.

An apparatus for carrying out the inventive method comprises an apparatus for generating a test pattern and an apparatus for evaluating the test pattern, whereby both apparatus are spatially separated from each other. The apparatus for generating a test pattern forms part of a rapid prototyping system.

Figure 1A:
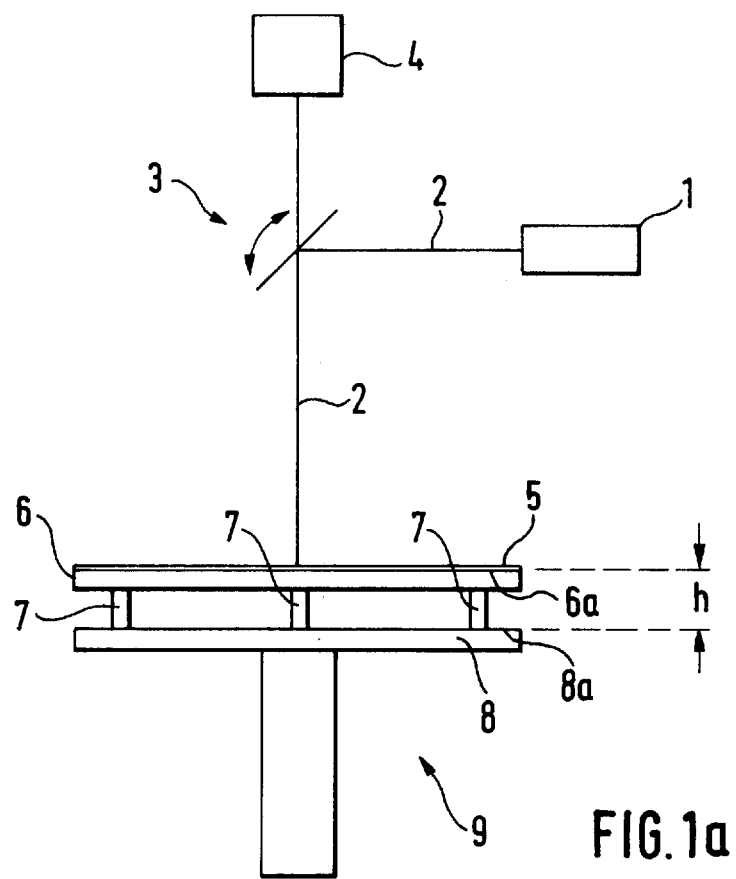
FIG. 1a is a schematic representation of an apparatus; for producing a test pattern for carrying out the inventive method.

As shown in FIG. 1a the apparatus for generating a test pattern comprises a laser 1 which outputs a focused laser beam 2, as well as an XY scanner 3 formed as a galvanometric scanner for deflecting the laser beam 2. A piezoelectrically controlled scanner may also be used. A control 4 is provided for controlling the scanner 3 and generates the data required for driving the scanner, for example voltage curves. A film 5 which is sensitive to a wavelength of the laser light and/or to a particular laser power for generating a test pattern is arranged in the course of the laser beam 2 deflected by the scanner 3 whereby the deflected laser beam 2 strikes the film 5. A suitable light sensitive film 5 is, for example, thermosensitive paper or UV-sensitive photographic paper. The film 5 defines a working plane of the scanner 3.

A plane support 6, for example a plate made of plexiglass, is provided for supporting the light-sensitive film which is arranged at the side 6a of the support facing the laser beam. On its side opposite to the film 5 or to the laser beam 2 the support 6 has level adjustable pedestals 7, for example adjustment screws, which serve to mount the support 6 to the upper side 8a of a support platform 8 of an object carrier 9 in the rapid prototyping system. The elevation of the support 6 can be adjusted in such a manner that the support 6 extends parallel to the upper side 8a of the support platform 8 with a defined distance h and therefore parallel to a surface of a bath of solidifiable material in the rapid prototyping system, the surface being above the object carrier and defining an image plane for the laser beam. The support 6 can e removed from the object carrier 9 together with the film 5 thereon so that it can be transferred to the apparatus for evaluating the test pattern after removal.

Figure 1B:
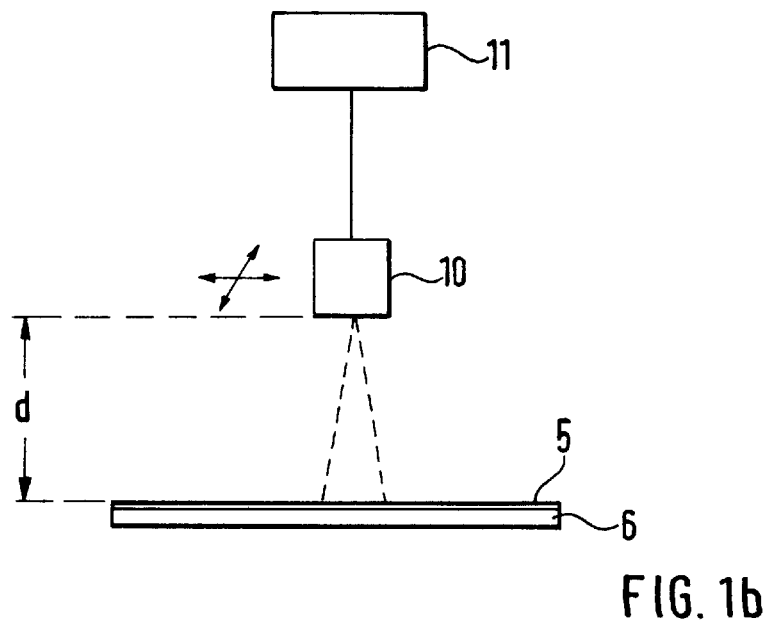
FIG. 1b is a schematic representation of an apparatus for producing the test pattern for carrying out the inventive method.

As shown in FIG. 1b the apparatus for evaluating the test pattern comprises a video camera 10 which can be positioned using a computer control and a computer 11 connected to the video camera 10. The apparatus further comprises a not shown level-adjustable holder for holding the support 6 with the film 5 thereon so that the film 5 is spaced from the lens of the video camera by a distance d. The position of the video camera 10 above the film 5 arranged within the apparatus can be selected so as to pass over the entire working field for generating partial pictures of a test pattern produced on the film 5.

According to a further embodiment a pixel scanner is used in place of the positionable video camera 10.

In the method of calibrating the scanner control 4 the support 6 is first horizontally adjusted, making use of the level-adjustable pedestals 7, by means of a bubble level so that the support 6 extends parallel to the support platform 8 and to the surface of the bath, resp.

Figure 2:
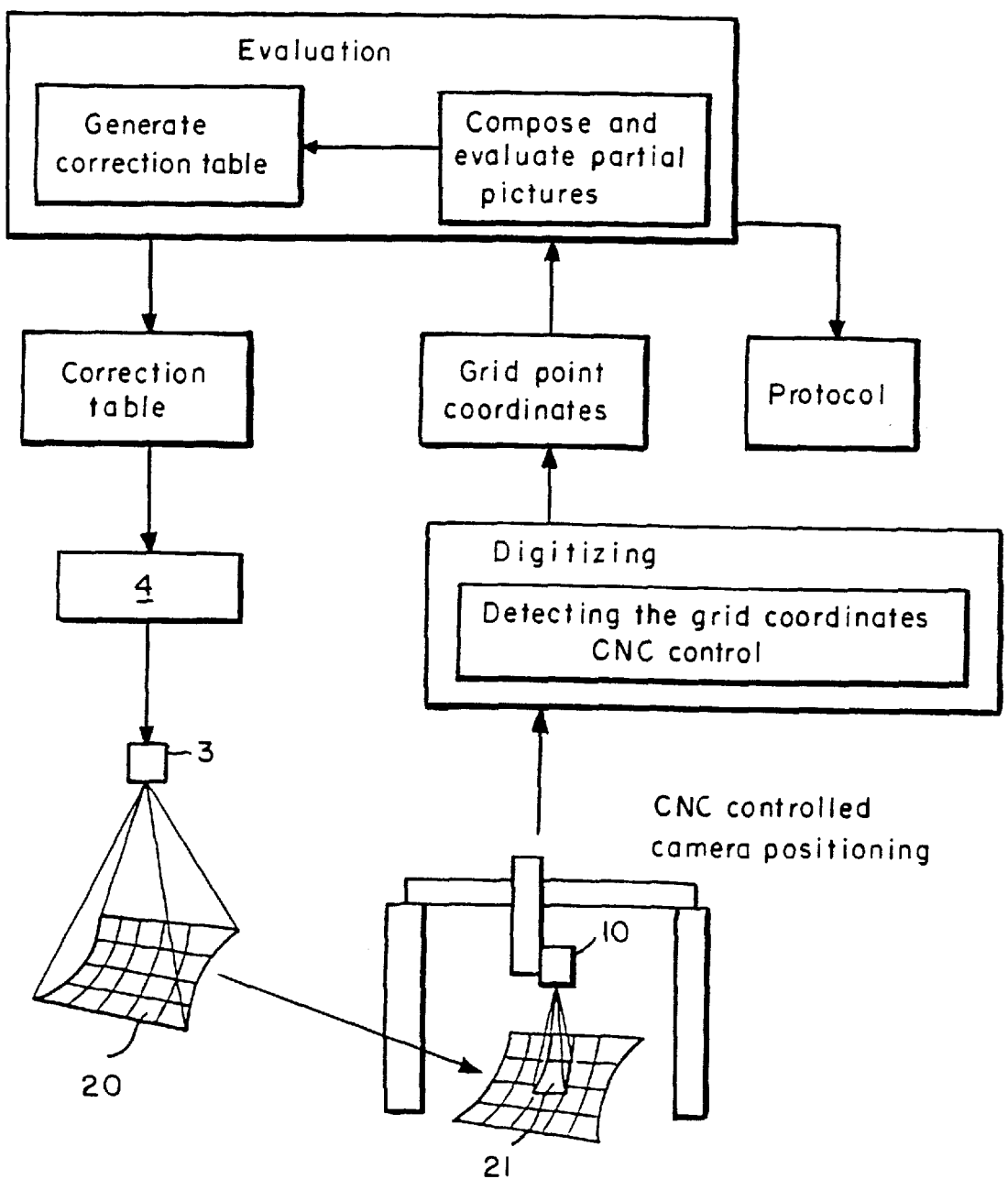
FIG. 2 is a schematic flow chart of the calibration method.

Thereafter the light-sensitive film 5 is placed or mounted on the surface of the support 6 facing the laser beam 2. As shown in FIG. 2 the light-sensitive film 5 is then exposed to radiation by deflecting the laser beam 2, using the scanner 3, to predetermined positions on the film 5 for generating a test pattern 20. The scanner 3 thereby deflects the laser beam 2 at the beginning of the iteration on the basis of an analytically produced correction table which defines the coordination of coordinates of deflection mirrors arranged within the scanner to the actual coordinates, i.e. the target points of the laser beam 2 on the working field. Preferably the exposure of the light-sensitive film is in the form of a test grid representing a coordinate grid of actual coordinates. The center of the light-sensitive film 5 and thus, the center of the working field is separately marked for producing a center code.

When recording the picture using a pixel scanner markings for partial picture detection are provided corresponding to the size of the pixel scanner.

The test pattern is generated in a very short time period, about 30 seconds or less. The probability of a considerable laser or scanner drift within this time period is very low. Thus, a stationary state of the laser and of the scanner is fixed in the test pattern 20.

The generated test pattern 20 is thereafter examined or scanned section by section. To this end the video camera 10 is progressively moved across the produced test pattern 20 so as to produce corresponding pattern portions 21 of the test pattern 20 with the camera. The size of the pattern portions 21 can be determined by selecting the lens of the video camera 10.

The use of the video camera 10 is advantageous, because the position can be strongly improved by selecting a suitable lens which in turn considerably enhances the resolution in the digitizing process. When using an economic and mobile pixel scanner, each pattern portion 21 is individually scanned.

Each pattern portion 21 is analyzed in the computer 11 using a corresponding image processing program. Grid crossing points of the test grid located within the pattern portion 21 are digitized on the basis of a half-tone analysis and stored as picture coordinates. The half-tone analysis considerably enhances the resolution as compared with a mere black-white analysis. The analysis allows the evaluation of test patterns having various contrasts, illumination levels and formats. Owing to the imaging characteristics of the video camera 10 the picture coordinates may deviate from the real coordinates which are defined by the target points of the laser beam on the working field.

When using a pixel scanner partial pictures corresponding to the size of the pixel scanner are digitized in overlapping manner.

Thereafter the picture coordinates of the grid points of the digitized pattern portions, as produced with the image processing program, and their center codes are transferred to an evaluation program. This evaluation program is used for composing the digitized pattern portions to an overall pattern whereby the evaluation program detects the center codes of the test pattern. When using a pixel scanner additionally produced position marks are used for evaluating and composing the pattern portions.

For calibrating the camera the picture coordinates of the produced overall pattern are compared with the digitized coordinates of a photomechanically produced reference grid, whereby a deviation between the picture coordinates and the real coordinates in the working plane, as produced by the imaging process of the camera, is detected and corrected so that the actual positions of the laser beam within the overall pattern are obtained in real coordinates. The center code of the test pattern may thereby be used for transformation. The evaluation of the overall pattern is stored in a protocol.

The correction table is modified on the basis of the comparison of the measured actual positions of the laser beam 2 on the test pattern 20 with predetermined desired positions.

The evaluation program has a graphical user interface and can therefore easily be operated. The program allows to analytically generate the unmodified correction table with and without plane field correction. Furthermore, the program can visualize measured points, compose and visualize the point coordinates of the overall test pattern independently of the grid constant, produce an evaluation protocol, modify the correction table using the measurement data and indicate correction tables as well as store the same in a form which is usable for the scanner control 4. The evaluation program is further able to process the measured height h of the distance between the support 6 and the upper side of the support platform 8 for generating an elevational correction for the correction table. The elevational correction serves for controlling the scanner in case that the calibration is made in a rapid prototyping system wherein the support 6 of the film 5 should not be positioned exactly in the plane of the surface of the bath of solidifiable material, for example because the process medium or the solidifiable material, resp., can not be removed therefrom.

The correction table modified by the evaluation program is thereafter transferred to the scanner control 4. It can be used for generating, measuring and evaluating a new test pattern. This evaluation may again be utilized for modifying the correction table. After one or two iterations of this process a scanner system with real coordinates is obtained.

The evaluation of test patterns from different rapid prototyping systems can be made one after each other and the thus obtained correction tables can be transferred to the systems by means of a suitable data transmission.

We claim:

1. A method for calibrating a deflection control of a laser beam for a rapid prototyping system, the method comprising the steps of
   a) defining position data for said laser beam,
   b) generating a test pattern by exposing a light-sensitive medium to said laser beam at desired positions defined by said position data,
   c) digitizing portions of said test pattern to generate digitized partial pictures of said test pattern,
   d) composing said digitized partial pictures to produce an overall picture of said test pattern,
   e) producing actual positions of said laser beam on said overall picture and comparing said actual positions with said position data, and
   f) calculating and providing correction data for said deflection control on the basis of said comparison.

2. The method of claim 1, comprising generating said digitized partial pictures by recording corresponding portions of said test pattern with an image recording device and thereafter digitizing said portions in a computer.

3. The method of claim 2, comprising using a positionable video camera for said picture recording device and computer controlling the positioning of said video camera for producing said portions of said test pattern.

4. The method of claim 2, comprising using a positionable pixel scanner for said image recording device and computer controlling the positioning of said pixel scanner for producing said portions of said test pattern.

5. The method of claim 1, wherein a film which is sensitive to a wavelength of said laser beam is used as said light-sensitive medium.

6. The method of claim 1, comprising using a test grid in the form of a coordinate screen for said test pattern.

7. The method of claim 1, comprising generating a center coding on said test pattern.

8. The method of claim 4, comprising generating position markings on said test pattern for generating said digitized partial pictures with said pixel scanner.

9. The method of claim 2, comprising carrying out a halftone analysis of said portions of the test pattern produced by said image recording device in a computer and generating said digitized partial pictures on the basis of said half-tone analysis in said computer.

10. The method of claim 1, wherein a reference grid is used for digitizing coordinates of said test pattern.

11. The method of claim 10, comprising using a photomechanically produced precision reference grid as said reference grid.

12. The method of claim 10, comprising comparing picture coordinates of said overall picture with coordinates of said reference grid and transforming said picture coordinates into real coordinates for obtaining actual positions of said laser beam in the overall picture in real coordinates on the basis of said comparison, said digitizing process including said comparing and said transforming.

13. The method of claim 5, comprising applying said film to a support which is mounted to an object carrier of said rapid prototyping system, the elevation of said support being adjustable relative to said object carrier.

14. The method of claim 1, comprising generating said test pattern at one place and evaluating said test pattern at a second place spatially separate from said first place.

15. Apparatus for calibrating a deflection control of a laser beam for a rapid prototyping system, the apparatus comprising:
   a laser for producing a focused laser beam;
   deflection control means for controllably deflecting said laser beam;
   a light-sensitive medium for exposure to said laser beam for generating a test pattern;
   an image recording device;
   positioning means for said image recording device; and
   a computer,
   said apparatus further comprising:
   means for generating digitized partial pictures of portions of said test pattern,
   means for composing said digitized partial pictures to an overall picture of said test pattern,
   means for comparing actual positions of said laser beam on said overall picture with desired position data defined by position coordinates, and means for calculating and providing correction data for said deflection control on the basis of said comparison.

16. The apparatus of claim 15, wherein said deflection control means comprises a galvanometric scanner and a galvanometer control means.

17. The apparatus of claim 15, comprising a support for supporting said light-sensitive medium.

18. The apparatus of claim 17, comprising means for mounting said support on an object carrier of said rapid prototyping system and means for adjusting the elevation of said support relative to said object carrier in direction of said laser beam.

19. The apparatus of claim 15, wherein said image recording device is a video camera.

20. The apparatus of claim 15, wherein said image recording device is a pixel scanner.

* * * * *

UNITED STATES PATENT AND TRADEMARK OFFICE
CERTIFICATE OF CORRECTION

PATENT NO.     : 5,832,415
DATED          : November 3, 1998
INVENTOR(S)    : Christian Wilkening et al.

It is certified that error appears in the above-identified patent and that said Letters Patent is hereby corrected as shown below:

Title page,
Item [22], please insert -- (22) PCT Filed: Sep. 21, 1995 --
Item [86], please insert --  (86) PCT No.: PCT/EP95/03724
                                     371 (c)(1), (2), (4) Date: April 18, 1997 --
Item [87], please insert -- (87) PCT Pub. No.: WO96/12217
                                   PCT Pub. Date: Apr. 25, 1996 --

Signed and Sealed this

Twenty-second Day of February, 2005

JON W. DUDAS
*Director of the United States Patent and Trademark Office*